United States Patent [19]

Blackwell

[11] Patent Number: 4,977,525
[45] Date of Patent: Dec. 11, 1990

[54] HIGHLY EFFICIENT METHOD AND APPARATUS FOR CALCULATING ROTATIONAL SPEED

[75] Inventor: Andrew K. Blackwell, Kokomo, Ind.

[73] Assignee: Delco Electronics Corporation, Kokomo, Ind.

[21] Appl. No.: 358,790

[22] Filed: May 30, 1989

[51] Int. Cl.$^5$ .............................................. G01P 3/36
[52] U.S. Cl. .................................. 364/565; 364/569; 324/166
[58] Field of Search ............ 364/565, 569, 575, 426.01, 364/426.02, 426.03, 426.04, 431.04, 431.05, 431.07; 324/163, 164, 173, 166; 73/527, 528, 489, 518; 123/418; 377/15, 16, 19

[56] References Cited

U.S. PATENT DOCUMENTS

| | | | |
|---|---|---|---|
| 4,434,470 | 2/1984 | Thomas et al. | 364/565 |
| 4,527,248 | 7/1985 | Takase et al. | 364/565 |
| 4,794,551 | 12/1988 | Yoshida | 324/166 |
| 4,799,178 | 1/1989 | Spadafora et al. | 364/565 |
| 4,885,710 | 12/1989 | Hersberger et al. | 364/565 |

Primary Examiner—Thomas G. Black
Assistant Examiner—Michael Zanelli
Attorney, Agent, or Firm—Howard N. Conkey

[57] ABSTRACT

A process for maximizing the instruction processing efficiency of a digital computer for the purpose of calculating rotational speed wherein the calculation of speed is based upon speed signals generated by a tachometer. By (1) counting the quantity of the speed signals received during a fixed sampling period, and (2) recording the occurrence time of these speed signals only as necessary for the calculation of rotational speed, the invention improves over known methods in that it does not record the occurrence time of all speed signals, but rather records the occurrence time of only those speed signals necessary for the calculation. The invention accomplishes this by (a) anticipating when the speed signals necessary for the speed calculation will be generated (and subsequently received by the digital computer) and (b) recording the occurrence times only when it is anticipated that these necessary edges will be received by the digital computer.

14 Claims, 4 Drawing Sheets

HIGHLY EFFICIENT METHOD AND APPARATUS FOR CALCULATING ROTATIONAL SPEED

BACKGROUND OF THE INVENTION

This invention relates to a method for detecting the speed of a rotating member such as the wheel of a vehicle. Typically in order to sense the rotational speed of a rotating member, such as the wheel of a vehicle, a tachometer is provided that generates a signal having a frequency directly proportional to the rotational speed. The tachometer may take the form of a toothed ring rotated by the rotating member, the rotation of the ring being sensed by an adjacently located electromagnetic sensor. The electromagnetic sensor provides a pulse each time the toothed ring, and hence the vehicle wheel, rotates 1/N of one revolution where N is the number of teeth on the toothed ring. Each pulse may directly comprise the speed signal or alternatively may be shaped into a square wave speed signal. Given the relationship between the rotation of the toothed ring and the rotation of the vehicle wheel, the number of speed signals generated during a fixed time interval is directly proportional to the rotational speed of the rotating wheel. Similarly, the elapsed time between each of successive speed signals is inversely proportional to the rotational speed of the wheel.

There are many known methods for processing the speed signal. In one known method, described in U S Patent number 4,799,178 assigned to the assignee of this invention, the occurrence time of each speed signal and the number of speed signals generated during a fixed period of time are recorded. Utilizing the aforementioned relationships between a) the elapsed time between successive speed signals, b) the number of speed signals generated during a fixed sampling interval and c) the rotational speed of the rotating member, the rotational speed of the wheel is calculated at the end of each fixed sampling interval using the number of speed signals counted during the current sampling interval, the occurrence time of the last counted speed signal of the current sampling interval and the occurrence time of the next-to-last counted speed signal of the previous sampling interval. In this method the accuracy of the calculation is maximized by extending the calculation interval over a time greater than the sampling interval.

Typically, once the digital computer calculates rotational speed, that calculated speed is utilized as a variable in a vehicle control algorithm. For example, an antilock brake control system can use wheel speed to determine wheel slip and wheel acceleration. These parameters are then monitored, and wheel brake pressure is cyclically decreased and increased to avoid incipient wheel lock and provide higher braking efficiency and improved vehicle stability. The primary task for an antilock brake computer, therefore, is the modulation of wheel brake pressure, while the computation of wheel speed is an ancillary, albeit necessary, task.

Speed signal processing efficiency is a measure of the amount of time expended by the calculation device, such as a digital computer, in the calculation of rotational speeds versus the amount of time expended by the device in the performance of its other tasks. Since counting speed signals and recording the occurrence times for these signals involves a fixed amount of processing time per speed signal, processing efficiency using solely the method disclosed in US Patent 4,799,178 decreases as the number of speed signals being utilized in the speed calculation increases. Conversely, however, calculation accuracy increases as the amount of data (i.e. the number of speed signals) utilized in the speed calculation increases. Simply stated, the recording of edge occurrence times for every speed signal received while counting the number of speed signals received requires a great deal of processing time. This processing time in turn diverts the attention of the digital computer from its other functions and thereby sets an effective limit of processing capability. This limit is directly proportional to the rotational speed of the rotating member, and hence is directly proportional to the frequency of the occurrence of speed signals. Beyond this limit, the digital computer devotes too much processing time to the calculation of rotational speed to adequately service its other critical tasks. Speed processing efficiency could be increased by reducing the number of speed signals generated by the tachometer (i.e. fewer teeth of the toothed ring). However, that would sacrifice calculation accuracy. Similarly, the fixed sampling period could be decreased. But that would result in lower calculation resolution. Ideally, to maximize accuracy as well as processing efficiency, a speed calculation method should count and record the occurrence time of only those speed signals necessary to the calculation without compromising the accuracy or resolution of that calculation.

SUMMARY OF THE INVENTION

This invention discloses a process for maximizing the instruction processing efficiency of the digital computer for the purpose of calculating rotational speed of a rotating member by (1) counting the quantity of the speed signals received during a fixed sampling period, and (2) recording the occurrence time of these speed signals only as necessary for the calculation of rotational speed. The invention improves over the known methods in that it does not record the occurrence time of all speed signals, but rather records the occurrence time of only those speed signals necessary for the calculation. The invention accomplishes this by (a) anticipating when the necessary speed signals, or edges, for the speed calculation will be generated (and subsequently received by the digital computer) and (b) recording the occurrence times only when it is anticipated that these necessary edges will be received by the digital computer. By improving the speed processing efficiency, the digital computer has more time available to perform its other primary and critical tasks. Thus, a system using this invention in the calculation of rotational speeds, through its greater speed processing efficiency, may be improved to: perform more vehicle control tasks within the same period of time, operate at higher speeds or process all of its necessary tasks within a shorter control cycle thereby increasing control accuracy.

DESCRIPTION OF THE DRAWINGS

This invention may be better understood by referencing the following description of the preferred embodiment and the drawings in which.

DESCRIPTION OF THE PREFERRED EMBODIMENT

Figure 1:
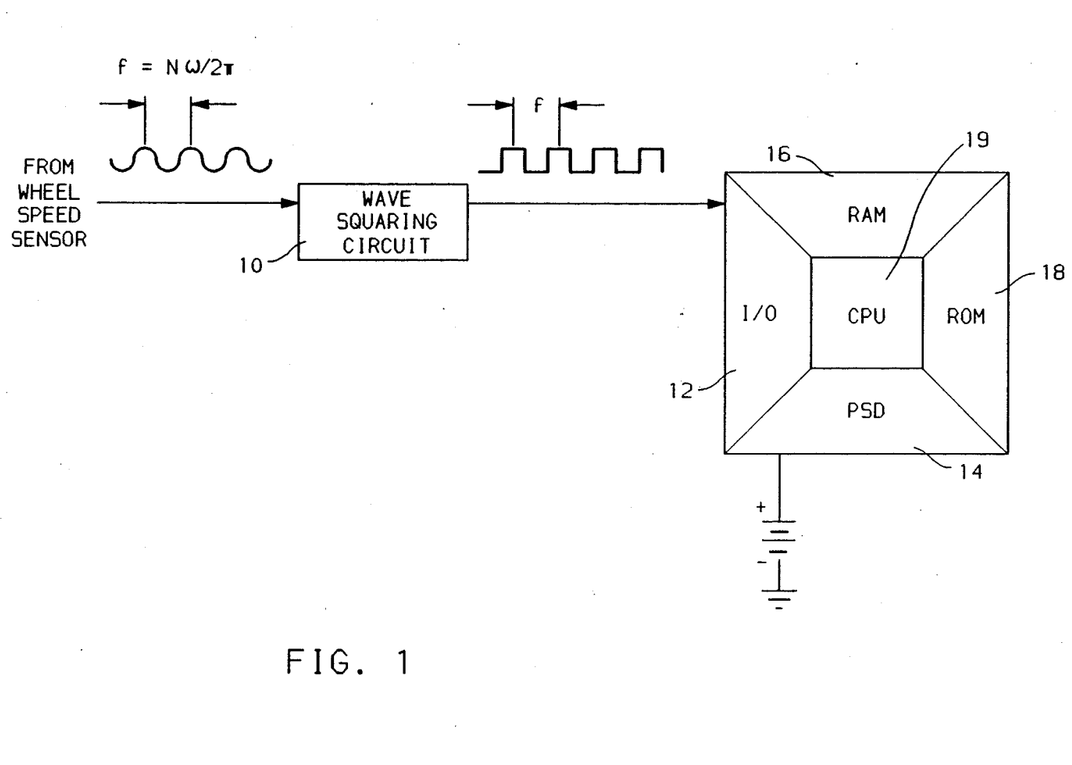
FIG. 1 is a symbolic diagram of the digital computer and tachometer interface circuitry.

The preferred embodiment is described as taking the form of a speed sensing device for the wheel of a vehicle. The speed of this wheel can be detected using a tachometer. The tachometer may take the form of a toothed ring located near an electromagnetic sensor which senses the passing of teeth as the toothed ring is rotated by the wheel. In a typical automotive application, the toothed ring is attached to the axle and spline assembly of the vehicle wheel. The rotational speed of the toothed ring is directly proportional to the rotational speed of the wheel, the speed of which is desired to be measured. As the toothed ring is rotated in unison with the wheel, a pseudo-sinusoidal signal, having a frequency directly proportional to the rotational frequency of the wheel, is generated by the tachometer. Given that the toothed ring has N teeth, the frequency, f, of the generated signal is $f = N\omega/2\pi$ where $\omega$ is the rotational speed of the wheel. This pseudo-sinusoidal signal is filtered through a squaring circuit 10 to produce a square wave signal whose frequency is identical to the frequency of the generated signal. This squared signal is transmitted to the I/O 12 of a digital computer. The I/O 12 has logic and threshold circuitry which allows the digital computer to detect, or respond to, either the rising edge or the falling edge or both rising and falling edges of the processed tachometer signal. In addition to the I/O 12, the digital computer has: (a) power supply device (PSD), 14 which interfaces the digital computer to the vehicle power source, (b) random-access memory (RAM) 16 used for variable recording and storage, and (c) read-only memory (ROM) 18 in which the instructions necessary to implement this invention are encoded. These instructions are retrieved and executed by (d) the CPU 19 which is the information processing and computational architecture of the digital computer.

Figure 2:
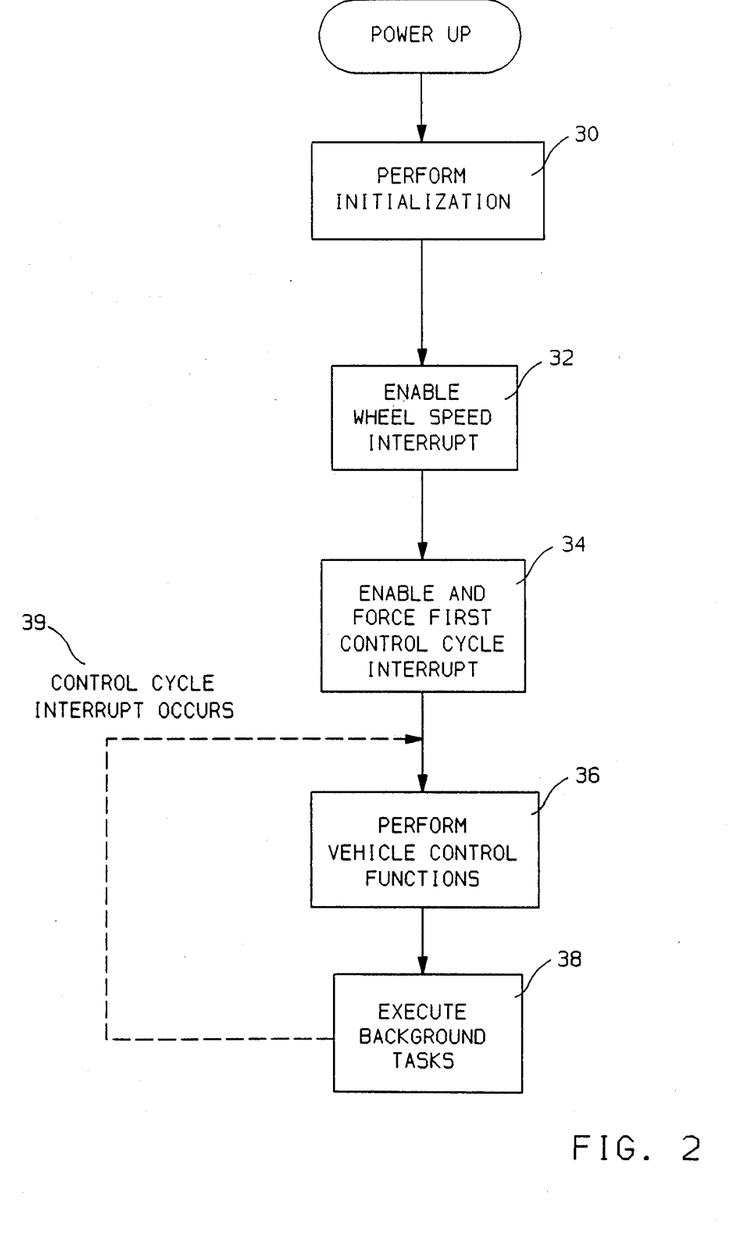
FIGS. 2 and 4 are flow charts detailing the operation of the digital computer.
Figure 3:
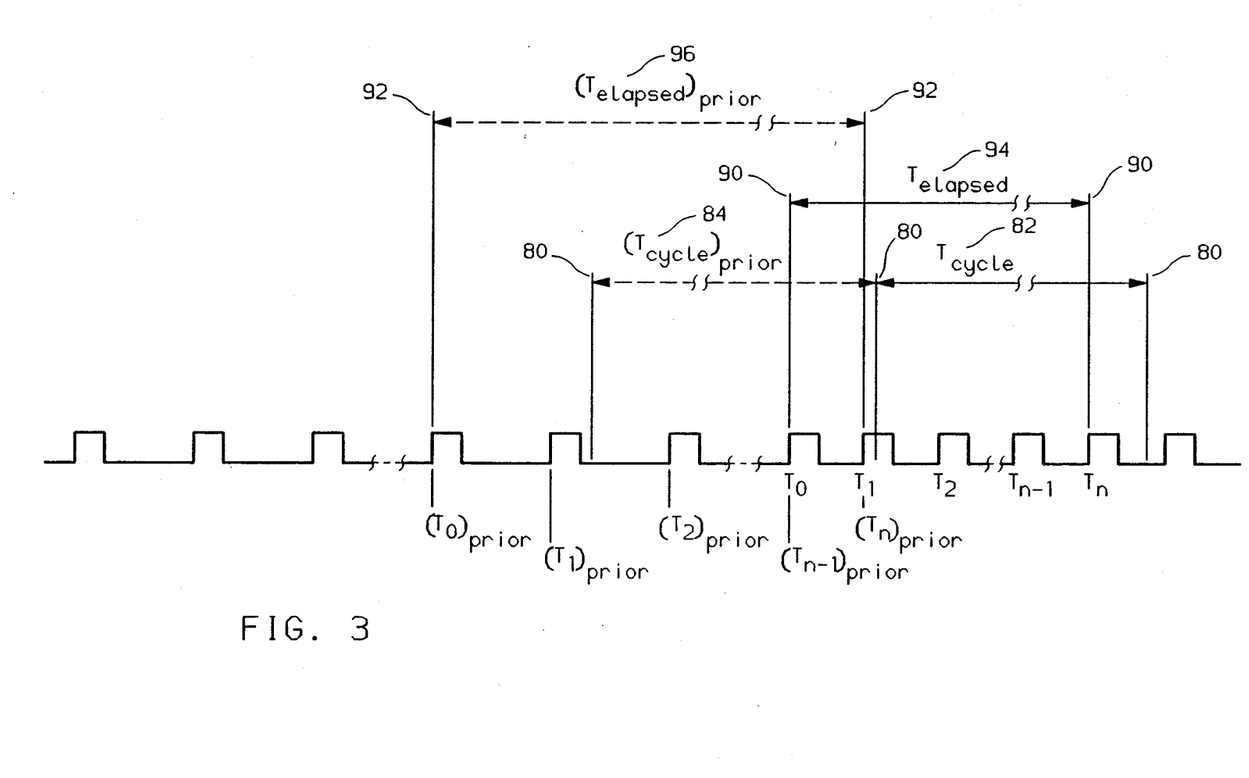
FIG. 3 is an illustration of the speed signal and the preferred calculation method.
Figure 4:
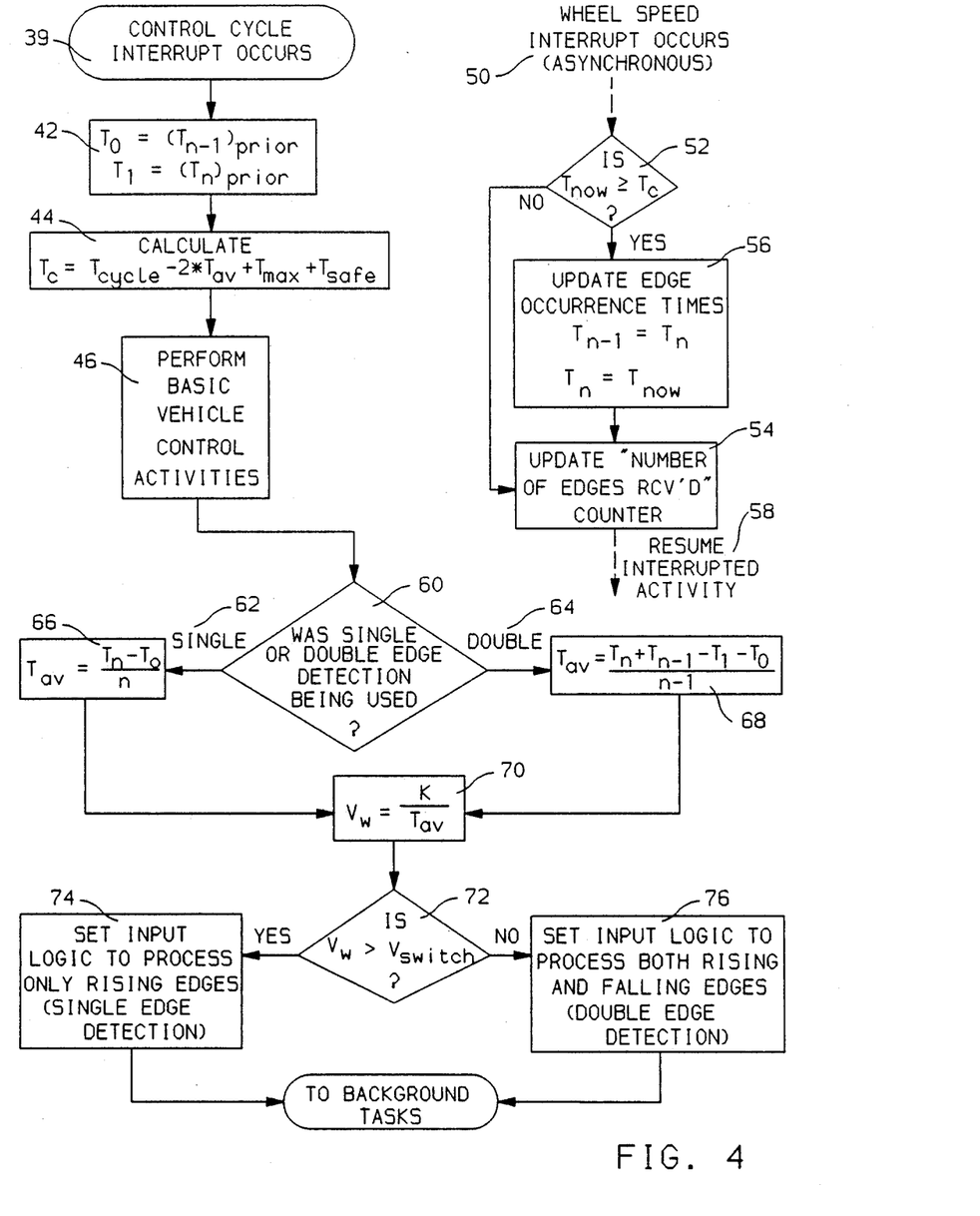

Turning now to FIGS. 2, 3 and 4, the computation of rotational speed from the processed tachometer signal is detailed. It should be briefly noted that when referring to the flow chart function blocks of FIGS. 2 and 4, the general function described by block nn will be referenced as <nn>. This is to emphasize the fact that any one of a variety of known information processing languages could be utilized by one skilled in the art to accomplish the general function described by function block nn. Therefore, the description of process <nn> refers to the general task embodied in function block nn, and should in no way be considered to represent the actual information processing instructions necessary for a device, such as a digital computer, to execute the instant task.

FIG. 2 depicts the general operation of the digital computer. When the computer is powered-up, via the vehicle ignition system or other means, the computer will begin executing the instructions encoded in ROM 18. The computer will first perform initialization 30, which entails clearing registers, initializing RAM variables to calibrated values, stabilizing voltage levels at the I/O and other basic functions of the digital computer. Next, the computer enables the wheel speed interrupt logic 32. The wheel speed interrupt logic processes the incoming speed signal in the following manner: (a) the speed signal is interfaced to the digital computer through the I/O 12; (b) assuming the speed signal has been shaped into a square wave, as shown in FIG. 1, the speed signal is considered to be composed of a series of rising followed by falling "edges"; c) the I/O 12 of the computer can detect either rising or falling (called "single") edges or both rising and falling (called "double") edges; d) the digital computer's logic configures the I/O 12 to detect either single or double edges, as will be detailed later in this disclosure; (e) whenever an edge is detected by the I/O 12, an interrupt is generated in the digital computer; (f) the interrupt causes the digital computer to temporarily discontinue the particular ROM 18 instruction it was processing and instead "jump" to an interrupt handling routine; (g) once the interrupt has been "handled" in the interrupt handling routine, the digital computer resumes processing the particular ROM 18 instruction it was processing prior to the interruption. Utilizing an interrupt scheme such as this alleviates the need to continuously sample the speed signal for new data, as would be required if a polling scheme were used. Because the frequency of the incoming speed signal (which is proportional to the speed of the rotating member) is variable, the wheel speed interrupt is said to be received and handled on an asynchronous basis.

Continuing along path <30>-<32>, the next task of the digital computer, as encoded in ROM 18, is to enable and force the first control cycle interrupt <34>. A control cycle interrupt is generated once during each of successive fixed periods, such as once every 5 msec. The control cycle interrupt is used to (1) establish uniformity of vehicle control functions and (2) create a fixed sampling period for the calculation of wheel speed, as will be detailed later in this disclosure. The control cycle itself consists of the execution of all necessary vehicle control functions <36> and all background tasks <38>. In addition to the calculation of rotational speed, with which this invention disclosure deals exclusively, the necessary vehicle control functions <36> may also include: antilock brake control, wheel spin and acceleration control, engine spark and torque management or transmission shift management. Additionally, the background tasks <38> have been known to encompass the following application-specific functions: communication with other vehicle computers, communication with service tools or the updating of driver information clusters. All functions of the digital computer are performed within the confines of the fixed sampling period referred to as the "control cycle". Every time a control cycle interrupt occurs <39>, the digital computer begins executing the functions embodied in the control cycle. Consequently, if the digital computer has not completed all of the necessary functions of the control cycle before a control cycle interrupt occurs, the digital computer begins a new control cycle before finishing the previous control cycle's tasks. Such a condition is highly undesirable, as there is no means for determining which functions have been properly completed and which functions were left unattended. Given this restriction, it is important that the recording of speed signal information and the calculation of rotational speed be efficient, so as to allow the digital computer enough time to complete its other necessary tasks.

Throughout the discussion of this invention, the following terms will be used: (1) An "edge" is either the rising or falling edge of the squared speed signal, as shown in FIG. 1. The edges are transmitted to and received by the I/O interface circuitry of the digital computer. (2) When an edge is received at the I/O it is said to be "detected". Whether only rising or only falling (called "single") edges or both rising and falling (called "double") edges are detected is determined by the logic of the digital computer, which will be discussed in more detail later in this disclosure. (3) A pair of rising/falling edges indicates that a tooth on the toothed ring has approached, reached and left the vicinity of the electromagnetic sensor. The elapsed time between successive rising or successive falling edges can therefore be considered to represent the "time between teeth". This "time between teeth" is the amount of time elapsed while successive teeth rotate past the electromagnetic sensor, and is proportional to the rotational speed of the wheel. (4) The I/O interface threshold logic generates a "wheel speed interrupt" whenever an edge is detected. (5) The "current" control cycle is the fixed sampling period currently in progress, while the "prior" control cycle is the fixed sampling period just completed. (6) The "occurrence time" of an edge is the time, in relation to the digital computer's external clock, when an edge was detected and a subsequent interrupt was generated. Thus the "last" and "next-to-last" edges are the last and next-to-last edges, respectively, detected during a given control cycle.

FIG. 3 is a diagram illustrating some of these terms. The fixed time segments marked by the vertical lines 80 are control cycles. As can be seen, segment 82 is the current control cycle while segment 84 is the prior control cycle. The variable time segments marked by vertical lines 90 and 92 are calculation intervals. Segment 94 is the calculation interval for the current control cycle (segment 82), and segment 96 is the calculation interval for the prior control cycle (segment 84). Edges are detected during each of successive control cycles. When an edge is detected and a wheel speed interrupt is generated, an edge is said to have occurred. In this illustration, single rising edges are being detected. For a typical edge, k, the edge is the $k^{th}$ edge detected during the current control cycle, and this $k^{th}$ edge occurs at time $T_k$. The total number of edges used for the calculation of rotational speed during the current control cycle is "n". Thus, the last edge detected during the current control cycle is the $n^{th}$ edge, and it occurred at time $T_n$. Noting that the calculation interval 94 is greater than the control cycle 82, the $0^{th}$ and $1^{st}$ edges of the calculation interval occurred during the prior control cycle 84. Edge "n" is the last edge detected during the current control cycle, while edge "1" is the last edge detected during the prior control cycle. Similarly, edge "n−1" is the next-to-last edge detected during the current control cycle and edge "0" is the next-to-last edge detected during the prior cycle. Thus, at the beginning of each new control cycle, occurrence time $T_n$ and $T_{n-1}$ become $T_1$ and $T_0$ respectively, as is illustrated by $(T_n)_{prior}$ and $(T_{n-1})_{prior}$ appearing below $T_1$ and $T_0$. This feature allows for overlapping of speed calculation intervals and increases accuracy without increasing the sampling interval. By overlapping the calculation intervals (i.e. segment 94 overlaps segment 96) the calculation of rotational speed is less susceptible to noise associated with the detection of any given edge. These advantages are more fully discussed in U S Patent #4,799,178. Additionally, it should be realized that the subject invention disclosed in these instant materials would also be applicable to a variety of calculation schemes utilizing edge occurrence times and the quantity of edges in its calculation.

Utilizing an overlapping calculation interval, the rotational speed of the wheel, $V_w$, is calculated from the speed signal in the following manner:

$$V_w = \frac{K}{T_{av}} \text{ where } K = \frac{2 * \pi * r_w * 3600}{N * 5280 * 12}$$

and where $r_w$ is the rolling radius of the wheel and N is the number of teeth on the toothed ring, thus making K a conversion constant for converting units of teeth/sec into miles/hour. Given that single edge detection is being used, as illustrated in FIG. 3:

$$\text{then } T_{av} = \frac{T_n - T_0}{n}$$

From the equation related above, it can be seen that the necessary speed signal data for the calculation of rotational speed is (1) the number of single edges counted during the current control cycle, (2) the occurrence time of the last edge detected during the current control cycle and (3) the occurrence time of the next-to-last edge detected during the prior control cycle. Relatedly, if double edge detection is in use:

$$\text{then } T_{av} = \frac{T_n + T_{n-1} - T_1 - T_0}{n - 1}$$

and the necessary speed signal data is (1) the number of double edges counted during the current control cycle, (2) the occurrence time of the last and next-to-last edges detected during the current control cycle and (3) the occurrence time of the last and next-to-last edges detected during the prior control cycle. Conversely, it follows that the occurrence time of any other edges are unnecessary for the calculation. Restating this in ordinal fashion, the $0^{th}$, $1^{st}$, $n-1^{th}$ and $n^{th}$ edge occurrence times are necessary, while the $2^{nd}$, $3^{rd}$, ... $n-2^{th}$ edge occurrence times are not necessary for the calculation of rotational speed.

To achieve the highest possible calculation efficiency using these equations, it is imperative that no unnecessary data be recorded. If unnecessary data is recorded, the digital computer will devote too much time to the recording of speed signal data and not enough time to the performance of the other necessary vehicle control and background functions. However, it is also imperative that the digital computer properly record all of the speed signal data necessary for the calculation of rotational speed. If necessary data is omitted, the value of rotational speed calculated will be inaccurate. Given that rotational speed is often a critical parameter in vehicle control functions, the integrity of the dependent vehicle control system may be compromised if either the speed calculation consumes too much processing time or if the speed calculation is inaccurate.

From the structure of the preferred rotational speed equations, it can be seen that every edge detected during the current control cycle must be counted, but that the occurrence time of only the last and next-to-last edges of the current and prior control cycles need be recorded. Any additional data is unnecessary for the calculation of rotational speed and serves only to decrease wheel speed processing efficiency. Therefore, this invention has a means for anticipating when the last and next-to-last edges will be detected and subsequently begins recording occurrence times only when it is anticipated that these necessary edges will be detected. The number of edges (k=1, 2, ... n) detected during the control cycle are still counted regardless of whether the occurrence time of a particular edge "k" is recorded. This timing scheme is accomplished through the following equation:

$$T_c = T_{cycle} - [2 \cdot T_{av} + T_{max} + T_{safe}]$$

where $T_c$ stands for the amount of time during a control cycle that only the number of edges detected should be counted (also referred to as the "time to count only"), $T_{cycle}$ is the duration of the control cycle, $T_{av}$ is the average time between teeth as calculated using either of the previously related equations, $T_{max}$ is a value representing the maximum amount of change in rotational speed that is physically possible during a control cycle and $T_{safe}$ is a calculation safety margin. During the first $T_c$ milliseconds of a $T_{cycle}$ millisecond control cycle, the number of edges detected are counted, but no occurrence times are recorded. During the remaining ($T_{cycle}$-$T_c$) milliseconds of the $T_{cycle}$ millisecond control cycle, both the number of edges detected and the occurrence times of those edges are recorded. By recording the occurrence time of only those edges necessary for the accurate calculation of rotational speed, the digital computer maximizes processing efficiency. This allows adequate time for the digital computer to perform its other necessary vehicle control functions without compromising speed calculation accuracy.

Without this method, the digital computer would have a velocity "ceiling" above which the calculation of rotational speed consumed too much processing time or the digital computer to adequately service its other necessary vehicle control functions. Through the use of the instant invention, the digital computer is able to execute all of its necessary functions—the calculation of rotational speed and the processing and control of other necessary vehicle control and background tasks—when the rotating member is traveling at very high velocities which are significantly greater than the velocity achievable without the use of this invention. FIG. 4 is a detailed flow chart of the tasks that comprise the necessary vehicle control functions <36>, including the specific method composing this invention, which were related in brief on FIG. 2. Recall that the control cycle is a fixed sampling period of duration $T_{cycle}$ that begins with the occurrence of a control cycle interrupt <39>. When a new control cycle has just begun, the information stored in the various RAM variables reflect values determined during the prior control cycle. Therefore, the last and next-to-last occurrence times of edges for the prior control cycle, $T_1$ and $T_0$ respectively, are updated with the values stored in $T_n$ and $T_{n-1}$, which were determined during the prior control cycle (this process was related during the discussion of FIG. 3). The updating occurs at step <42>. Next, the "time to count only" period, $T_c$, is calculated <44>. This time represents the portion of the control cycle during which only the number of edges detected during the control cycle are recorded. During the remaining ($T_{cycle}$- $T_c$) milliseconds of the $T_{cycle}$ millisecond control cycle, both the number of edges detected and their respective occurrence times are recorded. Once the recording intervals have been established, the digital computer proceeds to execute the necessary vehicle control functions <46>. These function may include: antilock brake control, engine spark/torque management or other functions particular to the desired application.

While the digital computer is processing its various necessary vehicle control tasks <46>, the rotational of the wheel causes the tachometer to generate a speed signal. As was illustrated in FIG. 1 and previously related, the tachometer can take the form of a toothed ring attached to the wheel of a vehicle with an adjacently located electromagnetic sensor, thereby providing for the measurement of rotational speed for that wheel. The resulting speed signal generated by the tachometer may be shaped into a square wave before it is transmitted to the I/O 12 of the digital computer. The shaping of the speed signal into a square wave causes the signal to appear as a series of rising followed by falling edges. When an edge is detected by the I/O, a wheel speed interrupt is generated. Because the detection of an edge and the subsequent generation of a wheel speed interrupt is related solely to the frequency of the rotating member, the interrupt is said to occur on an asynchronous basis. The occurrence of a wheel speed interrupt causes the digital computer to suspend the execution of whatever instruction it was processing and instead jump to an interrupt handling routine. This phenomenon is diagrammed as path <50>.

Once a wheel speed interrupt has occurred <50>, the interrupt must be "handled". In this embodiment, the wheel speed interrupt signifies that new rotational speed calculation data is available. Therefore, the digital computer must update the running count of edges detected during the current control cycle and update the recorded edge occurrence times as necessary for the accurate and efficient calculation of rotational speed. Recall that $T_c$, the "time to count only", was calculated at the beginning of the current control cycle at step <44>. This value represents the amount of time when the $2^{nd}$, $3^{rd}$, ... n−$2^{th}$ edges will be detected by the digital computer. Given the equations related earlier for calculating $T_{av}$ and hence rotational speed, the occurrence times of these edges are unnecessary for the calculation of rotational speed. As shown by decision block <52>, until $T_c$ milliseconds of the $T_{cycle}$ millisecond control cycle have elapsed, only the number of edges detected is updated <54>. Once the number of edges detected has been updated, the interrupt has been handled. The digital computer resumes processing the vehicle control instruction that it was performing prior to the interruption. The resumption of the interrupted activity is denoted by path <58>.

Depending upon the rotational speed of the wheel and hence the frequency of the processed tachometer signal, edges continue to be detected and wheel speed interrupts are subsequently generated. Whenever a wheel speed interrupt occurs <50>, the vehicle control activity being processed by the digital computer is temporarily suspended while the wheel speed interrupt is handled. As long as less than $T_c$ milliseconds have elapsed in the $T_{cycle}$ millisecond control cycle, the interrupt handling will consist solely of the counting of the detected edge (path <50>—<52>—<54>). This is because the occurrence times of these edges—the $2^{nd}$, $3^{rd}$, ... n−$2^{th}$ edges—are unnecessary for the calculation of rotational speed. Once the interrupt is handled, the digital computer resumes the interrupted activity <58>.

Eventually, $T_c$ milliseconds will elapse. When a wheel speed interrupt occurs, the digital computer again suspends processing of the vehicle control activities and jumps to the interrupt handling routine via path <50>. Since $T_c$ milliseconds have elapsed, the "time to count only" has expired and it is now necessary to record the occurrence times of the detected edges as well as count the number of edges detected. Decision block <52> is therefore satisfied and the occurrence times of the edges are recorded at step <56>. The updating of $T_{n-1}$ and $T_n$ is accomplished through a shifting process described as follows: (a) any time value stored in $T_n$ no longer represents the occurrence time of the last edge detected, and instead now represents the occurrence time of the next-to-last edge detected. (b) Therefore, $T_{n-1}$ is set equal to $T_n$ and $T_n$ is updated with the current clock time. This clock time reflects the time, in relation to the external clock of the digital computer, that the interrupt associated with the detected edge was generated. Having updated the occurrence times, the digital computer proceeds to update the running count of the number of edges detected (step <54>) and resumes the interrupted vehicle control activity <58>.

Any wheel speed interrupts occurring after $T_c$ milliseconds have elapsed during the $T_{cycle}$ millisecond control cycle are handled in the above fashion. When the interrupt occurs <50>, the digital computer suspends its vehicle control activity, updates both the occurrence times (step <56>) and the number of edges detected (step <54>), and resumes the interrupted vehicle control activity (returning along path <58>).

By handling wheel speed interrupts in two different fashions—counting the number of edges detected during the first $T_c$ milliseconds of the control cycle and later counting the number of edges and recording the occurrence times of edges during the remainder of the control cycle—the digital computer maximizes both processing efficiency and rotational speed calculation accuracy.

The calculation of rotational speed is only one task of the digital computer. As related earlier, performing the other vehicle control activities, referred to as step <46> in FIG. 4, can be considered the main task of the digital computer. At some point during the control cycle it will become necessary to calculate rotational speed from the edge data being recorded. The point at which the calculation of rotational speed occurs has been broken out in detail as steps <60> through <76>. Recalling the earlier related equations for calculating the time between teeth, $T_{av}$, the digital computer must decide which equation should be used. This occurs at step <60>. If single edge detection was exercised during the current control cycle (path <62>), the the digital computer calculates $$T_{av} = \frac{T_n - T_0}{n} \text{ at step } <66>,$$

where $T_{av}$ is the average time between teeth, $T_n$ is the occurrence time of the last edge detected during the current control cycle, $T_O$ is the occurrence time of the next-to-last edge detected during the prior control cycle and n is the number of edges counted during the current calculation interval, which is also equal to one greater than the number of edges counted during the current control cycle. However, if double edge detection was exercised during the current control cycle (path <64>), the digital computer calculates $$T_{av} = \frac{T_n + T_{n-1} - T_1 - T_0}{n - 1} \text{ at step } <68>,$$

where $T_{av}$ is the average time between teeth, $T_n$ and $T_{n-1}$ are the occurrence times of the last and next-to-last edges detected during the current control cycle, $T_1$ and $T_0$ are the occurrence times of the next-to-last edges detected during the prior control cycle and $n-1$ is one less than the number of edges counted during the current calculation interval, which is also equal to the number of edges counted during the current control cycle. Regardless of which method of detection was employed and how $T_{av}$ is calculated, the speed of the wheel is calculated at step <70> as $V_w = K/T_{av}$ where $V_w$ is the rotational speed of the wheel, $T_{av}$ is the time between teeth as computed above and K is a constant which converts teeth/sec into units of miles/hour. Once the speed of the wheel has been calculated, the digital computer proceeds to determine whether single or double edge detection should be employed for the next control cycle. Double edge detection involves the recording of the number of rising and falling edges as well as their associated occurrence times, while single edge detection involves the recording of only rising or falling edges and their occurrence times. Double edge detection, because twice as many edges and hence pieces of calculation data are recorded, results in greater accuracy than single edge detection. However, employing double edge detection also means that the digital computer will be interrupted from its main vehicle control tasks twice as often as when using single edge detection. Therefore, in this embodiment, the digital computer uses single edge detection at high speeds greater than V switch when many wheel speed interrupts are generated and uses double edge detection at lower speeds less than V switch when fewer interrupts are generated. This decision process is illustrated as steps <72>, <74> and <76>. The digital computer then proceeds to process the background tasks as the control cycle continues to completion.

The control cycle tasks are executed every control cycle. With the beginning of a new control cycle, the digital computer starts the control cycle. Once again, the edge occurrence times for the prior control cycle, $T_0$ and $T_1$, are updated using $(T_{n-1})_{prior}$ and $(T_n)_{prior}$ <42>. Next, the "time to count only", $T_c$, is calculated <44> and the digital computer proceeds to perform the other necessary vehicle control tasks <46>. If a wheel speed interrupt occurs <50> during the first $T_c$ milliseconds of the $T_{cycle}$ control cycle, only the number of edges detected is counted (<52>—<54>) before the interrupted task is resumed <58>. However, during the remainder of the control cycle ($T_{cycle}-T_c$), if a wheel speed interrupt occurs <50>, its occurrence time is recorded <56> and it is counted <54> before the interrupt task is resumed <58>. At some point during the control cycle, the speed of the rotating member is calculated (steps <60> through <70>) and the detection scheme for the next control cycle is established (steps <72> through <76>). The digital computer then proceeds to process the background tasks as the control cycle continues to completion.

I claim:

1. A method for measuring a speed of a rotating member, the method comprising the steps of:

generating a speed signal for each predetermined angular rotation of the member, the generated signal being directly proportional in frequency to the rotational speed of the member;

establishing successive control cycles each having a calculation interval associated therewith;

counting a number of speed signals generated in each calculation interval; and for each control cycle, calculating an average time between successive speed signals as a measure of speed of the rotating member based upon (1) the number of speed signals counted in the calculation interval associated with the control cycle and (2) occurrence times of selected speed signals generated in the calculation interval, the occurrence times being determined by (a) forecasting a time in the control cycle after which the selected speed signals will be generated and (b) recording the occurrence time of each sped signal generated in the calculation interval after the forecasted time.

2. The method of claim 1 wherein the forecasted time is in accordance with the expression $T_c = T_{cycle} - 2*T_{av} + T_{max} + T_{safe}$ where $T_c$ is the time after which the selected speed signals will be generated, $T_{cycle}$ is the duration of the control cycle, $T_{av}$ is an average time between successive speed signals generated during the calculation interval associated with a prior control cycle, $T_{max}$ is a value representing the maximum physically possible change in $T_{av}$ during a control cycle and $T_{safe}$ is a calculation safety margin.

3. A system for measuring a speed of a rotating member, the system comprising in combination:

means for generating a speed signal for each predetermined angular rotation of the member, the generated signal being directly proportional in frequency to the rotational speed of the member;

means for counting a quantity of speed signals generated during each of successive fixed sampling periods;

means for forecasting a time in a fixed sampling period when speed signals, whose occurrence times are necessary for the calculation of rotational speed, will be generated;

means for recording an occurrence time for each speed signal generated in the fixed sampling period after the forecasted time; and means effective at the end of each fixed sampling period for determining the speed of the rotating member using (a) the quantity of speed signals generated during the fixed sampling period and (b) the occurrence times of the speed signals generated in the fixed sampling period after the forecasted time.

4. The system of claim 3 wherein the forecasted time is in accordance with the expression $T_c = T_{cycle} - 2*T_{av} + T_{max} + T_{safe}$ where $T_c$ is the time after which speed signals whose occurrence times are necessary to the calculation will be generated, $T_{cycle}$ is the duration of the fixed sampling period, $T_{av}$ is an average time between successive speed signals generated during a prior fixed sampling period, $T_{max}$ is a value representing the maximum physically possible change in $T_{av}$ during a fixed sampling period and $T_{safe}$ is a calculation safety margin.

5. A method for measuring a speed of a rotating member, the method comprising, in combination, the steps of:

generating a speed signal for each predetermined angular rotation of the member, the generated signal being directly proportional in frequency to the rotational speed of the member;

counting a quantity of speed signals generated during each of successive fixed sampling periods;

forecasting a time in a fixed sampling period when speed signals, whose occurrence times are necessary for the calculation of rotational speed, will be generated;

recording an occurrence time for each speed signal generated in the fixed sampling period after the forecasted time; and determining, at the end of each fixed sampling period, the speed of the rotating member using (a) the quantity of speed signals generated during the fixed sampling period and (b) the occurrence times of the speed signals generated in the fixed sampling period after the forecasted time.

6. The method of claim 5 wherein the forecasted time is in accordance with the expression $T_c = T_{cycle} - 2*T_{av} + T_{max} + T_{safe}$ where $T_c$ is the time after which speed signals whose occurrence times are necessary to the calculation will be generated, $T_{cycle}$ is the duration of the fixed sampling period, $T_{av}$ is an average time between successive speed signals generated during a prior fixed sampling period, $T_{max}$ is a value representing the maximum physically possible change in $T_{av}$ during a fixed sampling period and $T_{safe}$ is a calculation safety margin.

7. A method for measuring a speed of a rotating member, the method comprising, in combination, the steps of:

generating a speed signal for each predetermined angular rotation of the member, the generated signal being directly proportional in frequency to the rotational speed of the member;

establishing successive control cycles each having a calculation interval associated therewith;

counting a quantity of speed signals generated in each calculation interval;

forecasting a time when the last and next-to-last speed signals of a calculation interval will be generated;

recording an occurrence time for each speed signal generated after the forecasted time so as to record the occurrence time of the last and the next-to-last speed signals generated during the calculation interval; and determining for each completed control cycle, the speed of the rotating member using (a) the quantity of speed signals generated during the calculation interval associated therewith and (b) the occurrence time of the next-to-last speed signal generated during a prior control cycle and the occurrence time of the last speed signal generated during the completed control cycle.

8. The method of claim 7 wherein the forecasting of a time when the next-to-last and last speed signals will be generated is accomplished through the use of expression $T_c = T_{cycle} - 2*T_{av} + T_{max} + T_{safe}$ where $T_c$ is the time after which the next-to-last and last and speed signals will be generated, $T_{cycle}$ is the duration of the control cycle, $T_{av}$ is an average time between successive speed signals generated during the calculation interval associated with the prior control cycle, $T_{max}$ is a value representing the maximum physically possible change in $T_{av}$ during a control cycle and $T_{safe}$ is a calculation safety margin.

9. The method of claim 8 wherein the average time between successive speed signals generated during a calculation interval is determined by a method which consists of:

determining for each completed control cycle, an elapsed time from the occurrence of the next-to-last speed signal generated during the prior control cycle to the last speed signal generated during the completed control cycle; and     dividing the elapsed time by the quantity of speed signals generated during the calculation interval associated with the completed control cycle.

10. The method of claim 9 wherein the speed of the rotating member is determined by multiplying the inverse of the average time between successive speed signals by a constant.

11. A method for measuring a speed of a rotating member, the method comprising, in combination, the steps of:

generating a speed signal for each predetermined angular rotation of the member, the generated signal being directly proportional in frequency to the rotational speed of the member;

counting a quantity of speed signals generated during each of successive fixed sampling periods;

forecasting a time when the last and next-to-last speed signals of a fixed sampling period will be generated;

recording an occurrence time for each speed signal generated after the forecasted time so as to record the occurrence time of the last and the next-to-last speed signals generated during a fixed sampling period; and     determining for each completed fixed sampling period, the speed of the rotating member using (a) the quantity of speed signals generated during the completed fixed sampling period and (b) the occurrence time of the next-to-last speed signal generated during a prior fixed sampling period and the occurrence time of the last speed signal generated during the completed fixed sampling period.

12. The method of claim 11 wherein the forecasting of a time when the next-to-last and last speed signals will be generated is accomplished through the use of the expression $T_c = T_{cycle} - 2*T_{av} + T_{max} + T_{safe}$ where $T_c$ is the time after which the next-to-last and last and speed signals will be generated, $T_{cycle}$ is the duration of the fixed sampling period, $T_{av}$ is an average time between successive speed signals generated during the prior fixed sampling period, $T_{max}$ is a value representing the maximum physically possible change in $T_{av}$ during a fixed sampling period and $T_{safe}$ is a calculation safety margin.

13. The method of claim 12 wherein an average time between successive speed signals generated during the completed fixed sampling period is determined by a method which consists of:

determining an elapsed time from the occurrence of the next-to-last speed signal generated during the prior fixed sampling period to the last speed signal generated during the completed fixed sampling period; and     dividing the elapsed time by the quantity of speed signals generated during the completed fixed sampling speed period.

14. The method of claim 13 wherein the speed of the rotating member is determined by multiplying the inverse of the average time between successive speed signals by a constant.

* * * * *